Figure 1:
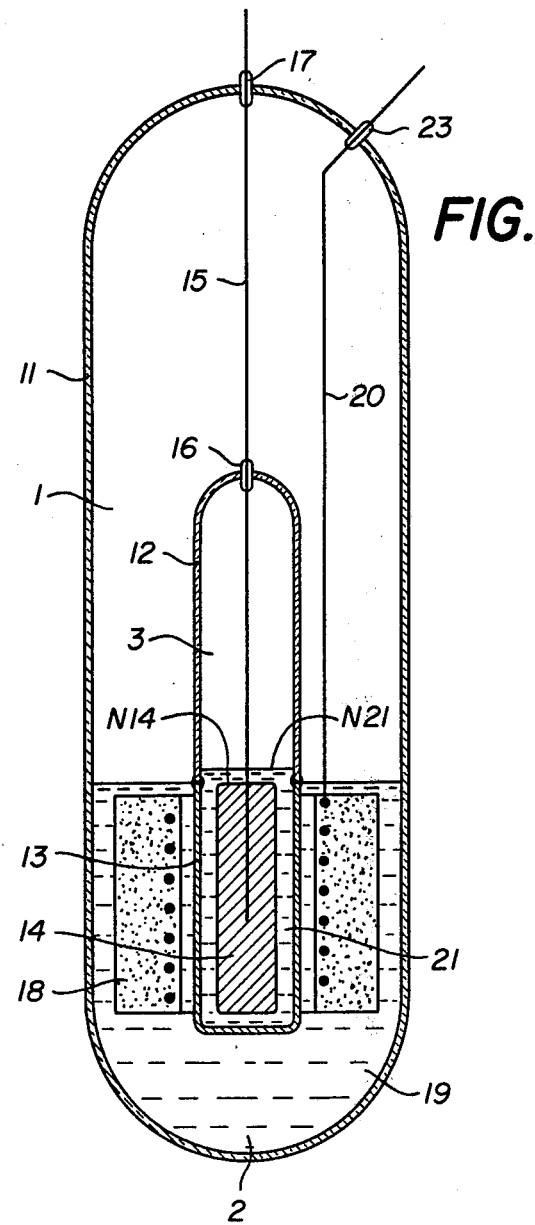

United States Patent [19]

Breda et al.

[11] 4,287,270
[45] Sep. 1, 1981

[54] SALT COMPOSITION USABLE AS A FUSED ELECTROLYTE IN ACCUMULATORS

[75] Inventors: Frédéric Breda, Oye Plage; Pierre Jonville, Clermont-Ferrand, both of France; Angelo Bonomi, Onex; Jack Ambert, Grand-Lancy, both of Switzerland

[73] Assignee: Proge Groupement d'Interet Economique, Paris, France

[21] Appl. No.: 143,289

[22] Filed: Apr. 24, 1980

[30] Foreign Application Priority Data

Apr. 26, 1979 [FR] France .............................. 79 11226

[51] Int. Cl.$^3$ ............................................. H01M 4/36
[52] U.S. Cl. ................................... 429/103; 429/199; 252/62.2
[58] Field of Search ..................... 429/103, 198, 199; 252/62.2, 500, 518

[56] References Cited

U.S. PATENT DOCUMENTS

| 3,472,745 | 10/1969 | Heudy | 429/188 X |
| 4,015,054 | 3/1977 | Cleaver et al. | 429/104 |
| 4,108,743 | 8/1978 | Minck | 204/64 R |

FOREIGN PATENT DOCUMENTS

| 861315 | 5/1978 | Belgium. |
| 2065171 | 7/1971 | France. |
| 2142695 | 3/1974 | France. |

*Primary Examiner*—Charles F. LeFevour
*Attorney, Agent, or Firm*—Finnegan, Henderson, Farabow, Garrett & Dunner

[57] ABSTRACT

An alkali salt composition free from hydroxides, melting at a temperature in the region of or greater than 180°, and usable in its molten state as a negative electrolyte for accumulators comprising an alkali metal negative electrode and an alkali alumina separator, contains an alkali metal amide, at least one alkali halide and an alkali hydride. It may also contain aluminium amide.

8 Claims, 2 Drawing Figures

SALT COMPOSITION USABLE AS A FUSED ELECTROLYTE IN ACCUMULATORS

This invention relates to electrochemical energy sources, and in particular to accumulators or secondary cells with an alkali metal anode operating in a molten alkali salt electrolyte, and comprising a separator in the form of an alkali alumina wall between the anode and cathode compartments.

The term "alkali alumina" used herein embraces $\beta$ and $\beta''$ alkali aluminates or mixtures of these aluminates. $\beta$ alkali alumina can be represented by the formula $ME_2O \cdot 11\ Al_2O_3$, and $\beta''$ alkali alumina can be represented by the formula $ME_2O \cdot 5\ Al_2O_3$, where ME represents one or more alkali metals, for example Na, K or Li. These aluminas can also contain one or more additives.

More particularly, the invention relates to an alkali salt composition free from hydroxides, which melts at a temperature in the region of or exceeding 180° C. and is usable in its molten state as an anode electrolyte, and in particular contains an alkali amide and at least one alkali halide.

In accumulators which use an alkali metal in its molten state as the anode, if this metal is in direct contact with the alkali alumina wall, it produces a gradual degradation of the wall as the charging and discharge cycles progress. During recharging, atoms of the alkali metal, for example sodium, are formed by electrolytic reduction of the sodium ions at the interface of the molten metal with the alkali alumina. Sodium dendrites can therefore form in the pores of the latter in the vicinity of its surface, and these can gradually lead to the formation of microfissures, which can extend right through the thickness of the separator and finally create short-circuits between the anode and cathode compartments. These defects have been remedied by interposing a liquid electrolyte between the actual anode and the separator. In this case, the reduction of the sodium ions during charging takes place at the molten sodium-interposed electrolyte interface, and the sodium atoms which are formed are immediately absorbed by the anode, with the result that no deposit of sodium metal can come into contact with the alkali alumina.

Such an interposed electrolyte is described in French Pat. No. 2142695 (C.G.E.), which uses mixtures of NaOH with NaBr or NaI. Likewise, Belgian Pat. No. 861,315 (B.D.C.) describes the use of interposed salts constituted by alkali tri or tetraalkyl aluminates or borates, certain mixtures of which melt at temperatures less than 100° C. Furthermore, U.S. Pat. No. 3,472,745 (North American Rockwell) describes electrolytes based on alkali amides and hydroxides which contain an alkali cyanide or iodide in order to lower the melting point of the mixture; such mixtures melt below 180° C.

It has now been discovered on the one hand that molten salt mixtures based on aluminates and borates containing organic substituents lack stability when in contact with molten sodium at around 180° C., and on the other hand that the presence of alkali hydroxides in an interposed electrolyte is not advisable when the accumulator operates at a temperature less than about 300° C. This is because the sodium reacts with the caustic soda in accordance with the reaction $NaOH + 2Na \rightarrow NaH + Na_2O$, the sodium oxide which is formed crystallising in the mixture below 300° C. and making the electrolyte unsuitable for normal operation. Hydroxides have therefore had to be removed from molten alkali salt mixtures operating at a temperature of the order of 180° to 200° C., and it has been found that electrolytes based on alkali amides, in particular $NaNH_2$, and containing an alkali halide such as NaCl, NaBr, NaI and their mixtures, are very suitable for this temperature range. It has however been found that in such an electrolyte, the alkali amide can decompose in the presence of the molten alkali metal to liberate nitrogen, the presence of which is undesirable because the pressure which it creates can lead to fracture of the anode compartment.

An object of the present invention is to provide a fused-salt electrolyte which is stable, free from hydroxides, and does not liberate nitrogen in use.

According to the invention there is provided an alkali salt composition free from hydroxide, usable in its molten state as an anode electrolyte for accumulators with an alkali metal negative electrode and with an alkali alumina separator, the said composition containing an alkali amide, at least one alkali halide, and an alkali hydride.

The presence of an alkali hydride opposes the above-mentioned formation of nitrogen, by displacing the reaction equilibrium towards the left in the following equation (in the case of sodium):

$$NaNH_2 + Na \rightleftharpoons 2NaH + \tfrac{1}{2}N_2 \tag{1}$$

The alkali metal used is preferably sodium, and the electrolyte according to the invention is preferably based on $NaNH_2$ and a sodium halide. The quantity of NaH preferably lies between 2 and 20%. By way of example, a mixture containing $NaNH_2$ and 10% by weight of NaH melts at 190° C., and this melting point can be further considerably lowered (to about 180° C. or even lower) by adding 5–20% by weight of NaI or NaBr, or 2–10% of NaCl. For comparision, $NaNH_2$ by itself melts at about 200° C.

More than one of the aforesaid halides can be used simultaneously, their total being preferably less than 25–30% by weight of the composition. It should be noted that the properties of the present electrolyte can be further improved by adding aluminium amide (or more simply powdered aluminium) in a quantity of 5 to 15% by weight of the total composition. In this respect, it has been found that the presence of $Al(NH_2)_3$ can strongly slow down the tendency of the sodium amide to attack the alumina of the separator in accordance with the reaction $$6NaNH_2 + Al_2O_3 \rightleftharpoons 2Al(NH_2)_3 + 3Na_2O \tag{2}$$
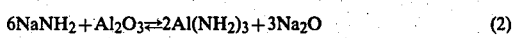

by displacing its equilibrium towards the left. Furthermore, the direct addition of powdered aluminium to the mixture rapidly provides the required amide in accordance with the reaction $$Al + 3NaNH_2 \rightarrow 3Na + Al(NH_2)_3 \tag{3}$$
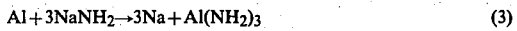

The use of such an interposed electrolyte enables an accumulator of very long life to be obtained.

Figure 2:
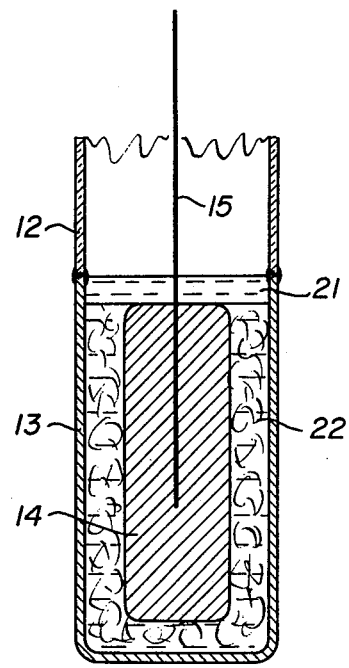

The invention will be further described by way of example with reference to the accompanying drawing, in which:

FIG. 1 is a diagrammatic section through a sodium-nickel accumulator or secondary cell in which an anode electrolyte according to the invention is used, and FIG. 2 is a diagrammatic representation of a modification of the anode compartment of such an accumulator.

The accumulator 1 illustrated comprises a first outer glass casing 11 enclosing the positive compartment 2, and a second casing inside the first for the negative compartment 3. This second casing is composed of a glass capsule 12, and, joined to it, an alkali alumina tube 13 containing sodium 14. A metal conducting wire 15, buried in the sodium and joined to the top of the two casings by way of glass-metal seals 16, 17 respectively, constitutes the (−) pole of the accumulator. The cathode compartment comprises a positive electrode 18, for example a mixture of powdered nickel and $NiCl_2$, immersed in a liquid electrolyte 19, for example Na-$(AlCl_4)$, the positive pole being represented by a conducting wire 20, the coiled end of which is buried in the cathode mass 18.

In the negative compartment 3, the accumulator 1 comprises a molten interposed salt 21 having the composition described hereinafter. It should be noted that this interposed salt has a coefficient of wettability for the alkali alumina which is much higher than that of the molten sodium for said alkali alumina. Consequently, for interfacial tension reasons, the sodium tends to collect at the centre of the negative compartment 3, whereas the interposed salt tends to form a continuous film between the sodium and alkali alumina, which is precisely the behaviour required to enable the sodium to be isolated from the material of the separator.

In a further embodiment (see FIG. 2), a porous mass 22 impreganated with the interposed salt 21 is disposed between the sodium and the separator wall in order to create a more rigid mechanical barrier between these functional elements. The porous mass used can be fibre or fabric of an insulating ceramic material (preferably non-siliceous), such as zircon, magnesia, alumina or a porous inert ceramic such as $Al_2O_3$.

Specific examples of cells as shown in the drawing will now be given.

EXAMPLE 1

70 parts by weight of $NaNH_2$, 20 parts of NaI and 10 parts of NaH were mixed intimately under the protection of nitrogen. A quantity of this mixture and of metal sodium was placed in an alkali alumina tube 13 joined in a sealed manner at its top to an open "Pyrex" (Trade Mark) tube 12, the quantities of the components being chosen such that after melting, the level of the electrolyte N21 slightly exceeded the level of the sodium (N14). The whole assembly was heated under inert gas until melting took place, a molybdenum rod 15 was inserted through the top of the tube so that its lower end was immersed into the molten sodium, and the top of the tube was closed by a flame, the conducting rod being simultaneously sealed at 16 as shown in the drawing. The negative tube was then surrounded by the positive electrode 18, and the entire assembly was inserted, under the protection of an inert gas, into a second capsule 11, open at its top and containing the molten cathode electrolyte ($Na(AlCl_4)$) 19. The capsule 11 was then closed with a flame so as to seal the negative and positive conductors 15 and 20 into its top, as shown at 17 and 23 in the drawing.

An accumulator was thus obtained in which the anode comprised 7 g of sodium, corresponding to a capacity of 6 Ah in accordance with the overall reaction:

$$2Na + NiCl_2 \rightleftharpoons 2NaCl + Ni \qquad (4)$$

This accumulator was operated at 185° C., and was subjected to 122 successive charging cycles (1A, 2 hours) and discharge cycles (1A, 2 hours). After these 122 cycles, no appreciable degradation of the accumulator elements was noted. The present accumulator thus proved to have a much greater stability than comparable known accumulators using the same type of solid electrolyte, which show signs of degradation after only 45 cycles.

EXAMPLE 2

A mixture comprising 70 parts of $NaNH_2$, 15 parts of NaI, 5 parts of NaH and 10 parts of powdered aluminium was prepared, and was used as the interposed anode salt in a secondary cell which in other respects was as set out in Example 1. This cell contained 7 g of anode sodium, and its theoretical capacity was 6 Ah. It was subjected to a series of 131 charging and discharge cycles under the following conditions: Charging 1A, 2 hours; discharge 1A, 2 hours. After 131 cycles, no appreciable degradation of the accumulator elements was noted.

The invention is not limited to the embodiments heretofore described, starting from which other methods and other embodiments can be conceived without departing from the scope of the invention. Thus for example, accumulators according to the invention could each comprise several negative and/or positive compartments.

We claim:

1. An alkali salt composition free from hydroxide, usable in its molten state as an anode electrolyte for accumulators with an alkali metal negative electrode and with an alkali alumina separator, the said composition containing an alkali amide, at least one alkali halide, and an alkali hydride.

2. A composition as claimed in claim 1, for use with a sodium negative electrode, and in which the metal in the alkali salt is sodium.

3. A composition as claimed in claim 2, comprising $NaNH_2$, 5 to 20% by weight of a sodium halide chosen from NaI and NaBr, and 2 to 20% by weight of NaH.

4. A composition as claimed in claim 3, further containing 5 to 15% by weight of $(NH_2)_3Al$ with respect to the total composition 5. A secondary electrochemical cell having an alkali metal negative electrode, a positive electrode, an alkali alumina separator between said electrodes, and between the separator and the negative electrode a molten-salt electrolyte composition comprising an alkali amide, at least one alkali halide, and an alkali hydride.

6. A cell as in claim 5 in which the alkali metal of the negative electrode and the alkali metal in the electrolyte composition is sodium.

7. A cell as in claim 6 in which the electrolyte composition contains $NaNH_2$, 5 to 20% by weight of a sodium halide chosen from NaI and NaBr, and 2 to 20% by weight of NaH.

8. A cell as in claim 7 in which the electrolyte composition further contains 5-15% by weight of $(NH_2)_3Al$, relative to the total composition.

* * * * *